US011154083B2

(12) United States Patent
Hashidate et al.

(10) Patent No.: US 11,154,083 B2
(45) Date of Patent: Oct. 26, 2021

(54) METHOD AND APPARATUS FOR PRODUCING FISH ROE PASTE HAVING FOREIGN SUBSTANCES REMOVED THEREFROM

(71) Applicant: NIPPON SUISAN KAISHA, LTD., Tokyo (JP)

(72) Inventors: Tomonori Hashidate, Tokyo (JP); Ken Mizuki, Tokyo (JP); Yuuki Nakajima, Tokyo (JP)

(73) Assignee: NIPPON SUISAN KAISHA, LTD.

( * ) Notice: Subject to any disclaimer, the term of this patent is extended or adjusted under 35 U.S.C. 154(b) by 306 days.

(21) Appl. No.: 16/333,897

(22) PCT Filed: Sep. 13, 2017

(86) PCT No.: PCT/JP2017/032986
§ 371 (c)(1),
(2) Date: Mar. 15, 2019

(87) PCT Pub. No.: WO2018/056134
PCT Pub. Date: Mar. 29, 2018

(65) Prior Publication Data
US 2019/0200657 A1     Jul. 4, 2019

(30) Foreign Application Priority Data

Sep. 20, 2016   (JP) .............................. JP2016-182842

(51) Int. Cl.
*A23L 17/30*         (2016.01)
*G01N 21/64*         (2006.01)
(Continued)

(52) U.S. Cl.
CPC .............. *A23L 17/30* (2016.08); *G01N 21/64* (2013.01); *G01N 21/85* (2013.01); *A23V 2002/00* (2013.01); *B07C 5/342* (2013.01)

(58) Field of Classification Search
CPC ........ A23L 17/30; G01N 21/64; G01N 21/85; A23V 2002/00; B07C 5/342
See application file for complete search history.

(56) References Cited

U.S. PATENT DOCUMENTS 4,976,356 A   12/1990   Mizuno et al.
5,335,791 A    8/1994   Eason
(Continued)

FOREIGN PATENT DOCUMENTS

JP    S61-192241 A    8/1986
JP    H04-030774 A    2/1992
(Continued)

OTHER PUBLICATIONS

English Translation for JP2007-286041 published Nov. 2007.*
Extended European Search Report for Application No. EP 17 85 2911.1 dated Apr. 17, 2020 (8 pages).

*Primary Examiner* — Anthony J Weier
(74) *Attorney, Agent, or Firm* — Harness, Dickey & Pierce, P.L.C.

(57) ABSTRACT

Provided is an apparatus for producing fish roe paste, the apparatus including: a flow passage forming section configured to form a flow passage for conveying the fish roe paste in a state of being thinly spread; at least two areas to be imaged that are formed in an upper surface and a lower surface of the flow passage forming section, and are each made of a material that transmits predetermined visible light or a predetermined ultraviolet ray; at least two image pickup sections that are provided at positions at which the at least two areas to be imaged are able to be imaged, and are configured to perform image pickup processing; an inspection section configured to perform inspection processing; and a removal section that is provided on a downstream side (Continued)

of a conveyance direction in the flow passage forming section, and is configured to perform removal processing.

13 Claims, 6 Drawing Sheets

(51) Int. Cl.
    *G01N 21/85*     (2006.01)
    *B07C 5/342*     (2006.01)

(56) References Cited

U.S. PATENT DOCUMENTS

| | | | |
|---|---|---|---|
| 5,448,652 A * | 9/1995 | Vaidyanathan | G06K 9/48 348/270 |
| 5,510,133 A * | 4/1996 | Yamamoto | A23L 17/70 426/272 |
| 6,058,209 A * | 5/2000 | Vaidyanathan | G06K 9/00127 382/133 |
| 6,243,485 B1 * | 6/2001 | Murakami | G06T 7/0012 250/492.1 |
| 6,271,022 B1 * | 8/2001 | Bochner | C12M 41/14 435/287.3 |
| 6,811,321 B1 | 11/2004 | Schmalzigaug et al. | |
| 7,298,885 B2 * | 11/2007 | Green | G06K 9/00127 382/133 |
| 7,319,031 B2 * | 1/2008 | Vent | G01N 35/04 422/63 |
| 2007/0238147 A1 | 10/2007 | Okamoto et al. | |
| 2012/0224055 A1 | 9/2012 | Yokozaki et al. | |
| 2013/0149738 A1 * | 6/2013 | Bolea | C12M 23/04 435/34 |
| 2014/0220610 A1 * | 8/2014 | Chandrapati | C12M 23/20 435/21 |

FOREIGN PATENT DOCUMENTS

| | | |
|---|---|---|
| JP | 2004-502962 A | 1/2004 |
| JP | 2007-286041 A | 11/2007 |
| JP | 2014-068619 A | 4/2014 |

\* cited by examiner

METHOD AND APPARATUS FOR PRODUCING FISH ROE PASTE HAVING FOREIGN SUBSTANCES REMOVED THEREFROM

CROSS REFERENCE TO RELATED APPLICATIONS

This application is a U.S. National Phase application of International Application No. PCT/JP2017/032986 filed on Sep. 13, 2017 and published in Japanese as WO 2018/056134 A1 on Mar. 29, 2018 and claims the benefit of priority from Japanese Patent Application No. 2016-182842 filed on Sep. 20, 2016. The entire disclosures of all of the above applications are incorporated herein by reference.

BACKGROUND

Technical Field

The present invention relates to a method of producing fish roe paste having foreign substances removed therefrom, and an apparatus for producing fish roe paste having foreign substances removed therefrom.

Related Art

As fish roe processed products, salt processed products, for example, pollock roe, salmon roe, sujiko (salmon roe still enclosed in the ovarian membrane), herring roe, flying fish roe, caviar, and Pacific cod roe, have been regularly eaten. Salted pollock roe is processed food obtained by salting the ovary of Alaska pollock. The freshness, maturity, and size of raw material eggs significantly influence the quality of the raw material eggs, and the freshest raw material eggs have an opaque pink color as a whole. Mature eggs (ovary just before the start of spawning), in which the ovary is normally developed to be opaque and is well-rounded, are regarded as a high-quality product. The size of the eggs is classified into three sizes of a large size, a medium size, and a small size based on the weight in many cases, but slightly varies depending on the fishing place, the season, and the like. As the quality, a pale pink color with gloss and firm eggs without eggs being damaged are preferred. Imported products are frozen fish roe in many cases, which are obtained by classifying the ovary of Alaska pollock based on the quality, size, and freshness, and subjecting the ovary to block freezing. Most of the fish roes are subjected to salting in processing factories in Japan to become products, for example, pollock roe, karashi mentaiko (pollock roe with chili pepper), and pollock roe paste.

An operation of removing foreign substances has hitherto been performed in order to remove the presence of foreign substances, in particular, parasites such as *anisakis* in fish roe paste, for example, pollock roe paste. Such parasites are killed by freezing, but become foreign substances in the fish roe paste. Therefore, it is required to remove the foreign substances. For example, some of the parasites such as *anisakis* have characteristics of fluorescing when being irradiated with visible light or an ultraviolet ray having a predetermined wavelength (see, for example, JP-2004-502962). In general, in the removal operation, an operator visually identifies portions corresponding to foreign substances and remove those portions while irradiating the fish roe paste with an ultraviolet ray.

However, visual inspection through use of an ultraviolet ray for a long period of time is not good for a human body. Further, the diameter of a nematode worm such as *anisakis* that can be visually identified is as small as from about 0.4 mm to about 0.7 mm, although varying depending on the operator.

Further, as the method of removing foreign substances, there is given, for example, a method using a mesh-shaped tray structure (see JP-2014-068619). However, some nematode worms such as *anisakis* have substantially the same diameter as that of a fish egg, and hence the nematode worms may pass through the mesh. Thus, it is difficult to reliably remove the nematode worms with this method.

An object of the invention is to provide a method of producing fish roe paste having foreign substances removed therefrom and an apparatus for producing fish roe paste having foreign substances removed therefrom, which are capable of reliably and efficiently removing foreign substances in fish roe paste.

SUMMARY

The invention has been made in order to solve at least some of the above-mentioned problems, and may be implemented as the following embodiments or application examples.

APPLICATION EXAMPLE 1

According to Application Example 1, there is provided a method of producing fish roe paste from which foreign substances are removed including:

image pickup processing of irradiating fish roe paste with visible light or an ultraviolet ray through at least two areas to be imaged that are formed across a full width of a flow passage for conveying the fish roe paste, and picking up an image of the fish roe paste passing by the at least two areas to be imaged;

inspection processing of determining presence or absence of foreign substances that fluoresce by the visible light or the ultraviolet ray based on the image picked up in the image pickup processing; and removal processing of removing from the fish roe paste a portion determined to contain the foreign substances in the inspection processing, wherein the at least two areas to be imaged are arranged so as to sandwich the flow passage therebetween.

APPLICATION EXAMPLE 2

In the method of producing fish roe paste from which foreign substances are removed according to the above-mentioned application example, a height of the flow passage in the at least two areas to be imaged may be adjusted to be within a range of from 1.4 mm to 15 mm in accordance with a type of fish roe to be used in the fish roe paste.

APPLICATION EXAMPLE 3

In the method of producing fish roe paste from which foreign substances are removed according to any one of the above-mentioned application examples, a height of the flow passage in the at least two areas to be imaged may be adjusted to be more than a maximum diameter of a fish egg in the fish roe paste and less than twice a minimum diameter of the fish egg in the fish roe paste.

APPLICATION EXAMPLE 4

In the method of producing fish roe paste from which foreign substances are removed according to any one of the above-mentioned application examples, the inspection processing may include determining presence or absence of the foreign substances having a linear shape.

APPLICATION EXAMPLE 5

In the method of producing fish roe paste from which foreign substances are removed according to any one of the above-mentioned application examples, the inspection processing may include setting one or more areas to be inspected in a direction orthogonal to a conveyance direction of the fish roe paste in the flow passage, and determining presence or absence of the foreign substances in each of the one or more areas to be inspected, and the removal processing may include removing the fish roe paste in the areas to be inspected that has been determined to contain the foreign substances.

APPLICATION EXAMPLE 6

According to Application Example 6, there is provided an apparatus for producing fish roe paste from which foreign substances are removed, the apparatus being used in the method of producing fish roe paste from which foreign substances are removed according to any one of the above-mentioned application examples, the apparatus including:

a flow passage forming section configured to form the flow passage for conveying the fish roe paste in a state of being thinly spread;

the at least two areas to be imaged that are formed in an upper surface and a lower surface of the flow passage forming section, and are each made of a material that transmits predetermined visible light or a predetermined ultraviolet ray;

at least two image pickup sections that are provided at positions at which the at least two areas to be imaged are able to be imaged, and are configured to perform the image pickup processing;

an inspection section configured to perform the inspection processing; and a removal section that is provided on a downstream side of a conveyance direction in the flow passage forming section, and is configured to perform the removal processing.

APPLICATION EXAMPLE 7

According to Application Example 7, there is provided an apparatus for producing fish roe paste from which foreign substances are removed, the apparatus including:

a flow passage forming section configured to form a flow passage for conveying fish roe paste in a state of being thinly spread;

at least two areas to be imaged that are formed in an upper surface and a lower surface of the flow passage forming section, and are each made of a material that transmits predetermined visible light or a predetermined ultraviolet ray;

at least two image pickup sections that are provided at positions at which the at least two areas to be imaged are able to be imaged, and are configured to pick up an image of the fish roe paste passing by the at least two areas to be imaged;

an inspection section configured to determine presence or absence of foreign substances that fluoresce by the predetermined visible light or the predetermined ultraviolet ray based on the image picked up by the at least two image pickup sections; and a removal section that is provided on a downstream side of a conveyance direction in the flow passage forming section, and is configured to remove from the fish roe paste a portion determined to contain the foreign substances in the inspection section.

Advantageous Effects of Invention

According to the invention, it is possible to provide a method of producing fish roe paste having foreign substances removed therefrom and an apparatus for producing fish roe paste having foreign substances removed therefrom, which reliably and efficiently remove foreign substances in fish roe paste.

DETAILED DESCRIPTION

Figure 1:
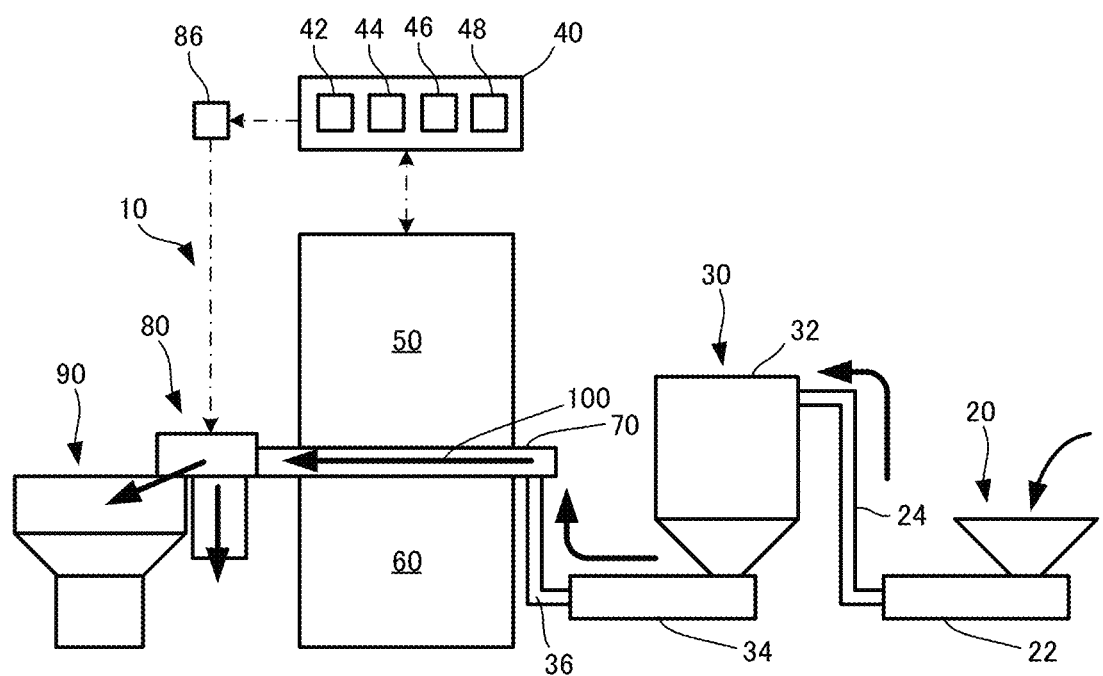
FIG. 1 is a side view for schematically illustrating an apparatus for producing fish roe paste having foreign substances removed therefrom.

Embodiments of the invention are described in detail below with reference to the drawings. Note that the following embodiments described below do not unduly limit the scope of the invention as stated in the claims. Further, all of the elements described below should not necessarily be taken as essential elements of the invention.

A method of producing fish roe paste from which foreign substances are removed according to one embodiment of the invention includes: image pickup processing of irradiating fish roe paste with visible light or an ultraviolet ray through at least two areas to be imaged that are formed across a full width of a flow passage for conveying the fish roe paste, and picking up an image of the fish roe paste passing by the at least two areas to be imaged; inspection processing of determining presence or absence of foreign substances that fluoresce by the visible light or the ultraviolet ray based on the image picked up in the image pickup processing; and removal processing of removing from the fish roe paste a portion determined to contain the foreign substances in the inspection processing, wherein the at least two areas to be imaged are arranged so as to sandwich the flow passage therebetween.

An apparatus for producing fish roe paste from which foreign substances are removed according to another embodiment of the invention includes: a flow passage forming section configured to form a flow passage for conveying the fish roe paste in a state of being thinly spread; at least two areas to be imaged that are formed in an upper surface and a lower surface of the flow passage forming section, and are each made of a material that transmits predetermined visible light or a predetermined ultraviolet ray; at least two image pickup sections that are provided at positions at which the at least two areas to be imaged are able to be imaged, and are configured to pick up an image of the fish roe paste passing by the at least two areas to be imaged; an inspection section configured to determine presence or absence of foreign substances that fluoresce by the predetermined visible light or the predetermined ultraviolet ray based on the image picked up by the at least two image pickup sections; and a removal section that is provided on a downstream side of a conveyance direction in the flow passage forming section, and is configured to remove from the fish roe paste a portion determined to contain the foreign substances in the inspection section.

1. Fish Roe Paste

Fish roe paste is an aggregate of eggs of fish roe, such as pollock roe. The fish roe paste may contain only eggs, or may also contain, for example, some liquid seasoning. The fish roe paste is obtained by removing the ovarian membrane from fish roe to provide only eggs. When fish roe is pollock roe, the fish roe paste thereof is called, for example, barako (in Japanese) or pollock roe paste. As the fish roe paste containing liquid seasoning, there are given those which are called fish roe sauce and fish roe paste seasoned for pasta and rice ball.

As the types of fish roe to be used in fish roe paste, there are given, for example, pollock roe, salmon roe, sujiko, herring roe, flying fish roe, caviar, and Pacific cod roe. Pollock roe contains, as components, 67% of moisture, 26% of protein, 1.5% of lipid, 1.5% of ash, and others. There is no particular limitation on the form of original eggs to be used. Any form of raw pollock roe, frozen pollock roe, salted pollock roe, and frozen salted pollock roe may be used. Salmon roe is obtained by dividing sujiko into pieces. Raw salmon roe is a spherical body having a liquid composition, which contains 53% of moisture, 25% of protein, 15% of lipid, and 7% of other components, covered with a relatively stiff egg membrane, and an egg contained in an ovary and color and gloss thereof vary depending on the type of fish. Regarding sujiko to be used, there is no particular limitation on the fish species. Sockeye salmon has a flat ovary and contains small eggs, with the color and gloss thereof being cherry-red. Chum salmon has a relatively round ovary and contains large eggs, with the color and gloss thereof being yellow-red. Humpback salmon has an elongated ovary and contains a small number of eggs, with the color and gloss thereof being yellow-red. Silver salmon has a flat ovary and is resemblant to sockeye salmon. Ovary of silver salmon contains small eggs and has a slightly purple-like color as compared to sockeye salmon. King salmon has a large ovary, and eggs thereof as large as those of chum salmon, with the color being slightly muddy yellow-red. There is no particular limitation on the form of raw material sujiko. Any form of raw sujiko, frozen raw sujiko, salted sujiko, and frozen salted sujiko may be used. When salmon roe is produced from sujiko, sujiko is stirred with, for example, saturated saline solution for from 3 minutes to 5 minutes, and then kneaded in a sieve to obtain salmon roe.

2. Overview of Apparatus for Producing Fish Roe Paste Having Foreign Substances Removed Therefrom An apparatus 10 for producing fish roe paste having foreign substances removed therefrom (hereinafter simply referred to as "fish roe paste production apparatus") to be used in a method of producing fish roe paste having foreign substance removed therefrom is described with reference to FIG. 1. FIG. 1 is a side view for schematically illustrating the fish roe paste production apparatus 10.

As illustrated in FIG. 1, the fish roe paste production apparatus 10 includes a loading section 20, a pretreatment section 30, a first image pickup section 50 and a second image pickup section 60, an inspection section 40, a removal section 80, and a product extracting section 90. The loading section 20 is configured to load fish roe paste that is a raw material. The pretreatment section 30 is configured to remove foreign substances in the fish roe paste. The first image pickup section 50 and the second image pickup section 60 are each configured to pick up an image of the fish roe paste subjected to the pretreatment. The inspection section 40 is configured to inspect the image of the fish roe paste subjected to the pretreatment. The removal section 80 is configured to remove the foreign substances. The product extracting section 90 is configured to extract the fish roe paste (product) having the foreign substances removed therefrom.

The fish roe paste loaded into the loading section 20 is fed to a first pipeline 24 connected to the pretreatment section 30 by a first pump 22. The first pump 22 is a pump configured to transfer the fish roe paste without crushing fish roe, and for example, a mohno pump is used. The fish roe paste transferred in a direction indicated by the arrow through the first pipeline 24 is fed to the pretreatment section 30.

The pretreatment section 30 includes a strainer 32, a second pump 34, and a second pipeline 36. The fish roe paste fed to the pretreatment section 30 has the foreign substances removed therefrom with the strainer 32. The strainer 32 has a large number of holes through which fish roe having a predetermined size can pass. The fish roe paste having passed through the holes is loaded into the second pump 34, and the foreign substances that cannot pass through the holes are discharged outside of the fish roe paste production apparatus 10. The second pump 34 is configured to feed the fish roe paste to the second pipeline 36, and the second pipeline 36 is connected to a flow passage 70. As the second pump 34, the same pump as the first pump 22 can be used.

The first image pickup section 50 and the second image pickup section 60 are arranged above and below the flow passage 70, respectively, to which the second pipeline 36 is connected. The fish roe paste fed from the second pipeline 36 to the flow passage 70 is conveyed in a conveyance direction 100 in a state of being thinly spread in the flow passage 70, and an image of the fish roe paste during conveyance is picked up by the first image pickup section 50 and the second image pickup section 60.

The inspection section 40 is electrically connected to the first image pickup section 50 and the second image pickup section 60. The inspection section 40 includes an image processing part 42, a determination part 44, a display part 46, and a signal output part 48. The determination part 44 is configured to determine the presence or absence of the foreign substances in an inspection image generated in the image processing part 42. When it is determined in the determination part 44 that there are foreign substances, the signal output part 48 outputs a defective product signal to the removal section 80.

The removal section 80 includes a removal section control unit 86. The removal section control unit 86 is configured to receive the defective product signal to output a command for removing the fish roe paste in the removal section 80. When it is determined in the determination part 44 that there are no foreign substances, the removal section 80 guides the fish roe paste to the product extracting section 90. When it is determined in the determination part 44 that there are foreign substances, the removal section 80 discharges a corresponding range of the fish roe paste containing the foreign substances to the outside of the fish roe paste production apparatus 10 in accordance with the command from the removal section control unit 86.

The product extracting section 90 is configured to collect the fish roe paste determined not to contain the foreign substances in the determination part 44 and perform a back-end process, for example, packaging of the collected fish roe paste as a product.

3. First Image Pickup Section and Second Image Pickup Section

Figure 2:
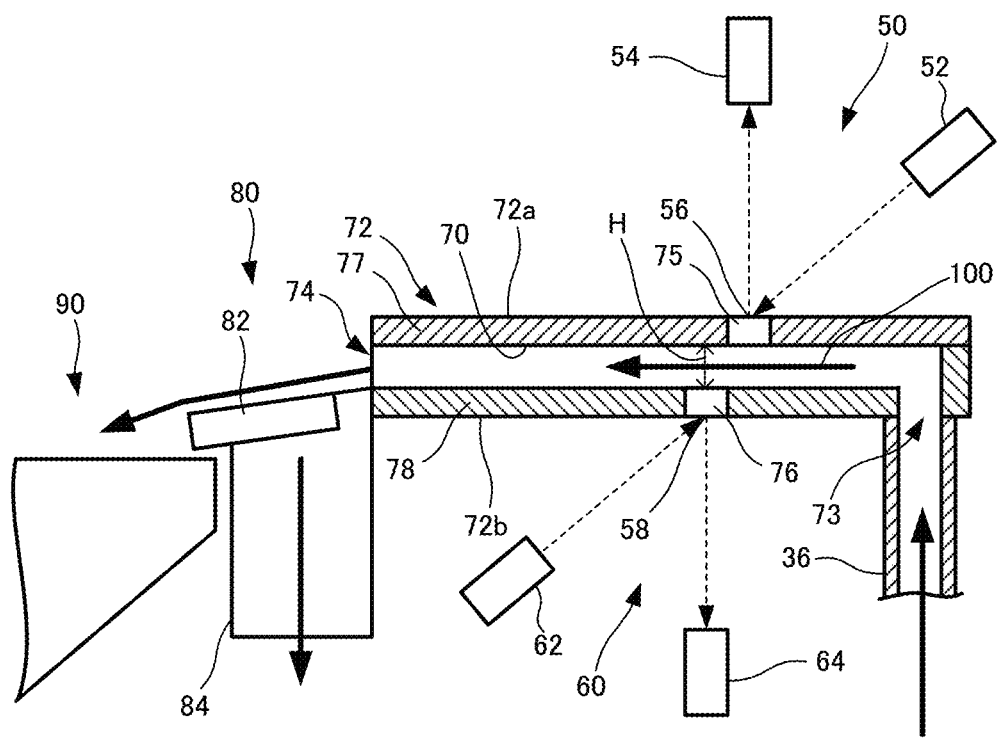
FIG. 2 is a side view of a first image pickup section, a second image pickup section, and a removal section, which are partially illustrated in cross section.
Figure 3:
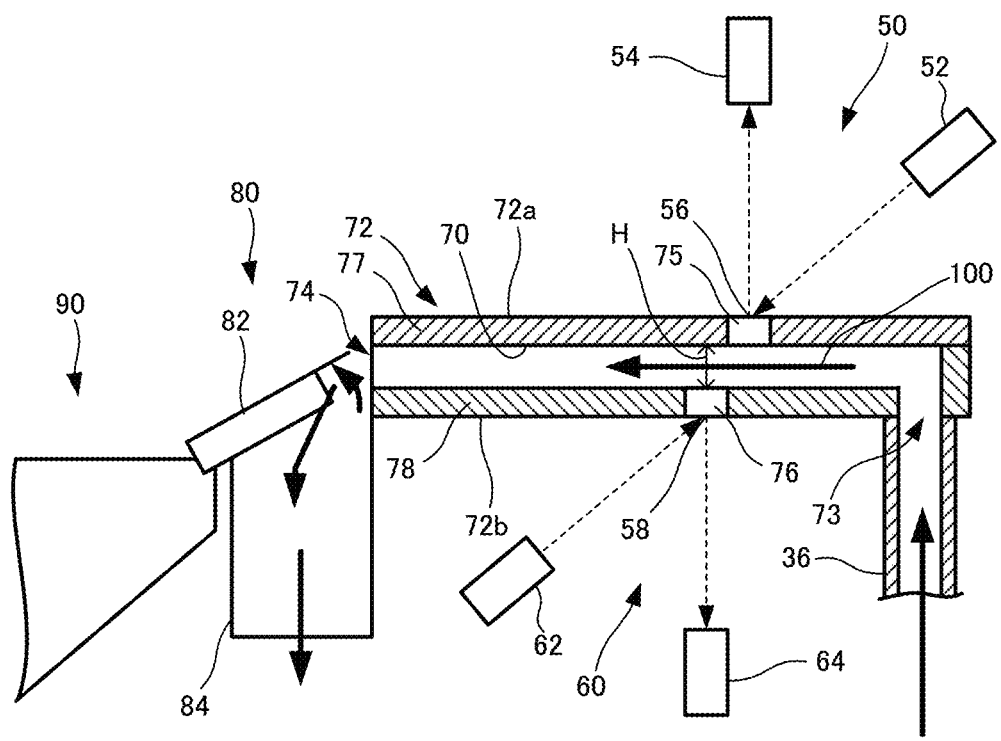
FIG. 3 is a side view of the first image pickup section, the second image pickup section, and the removal section, which are partially illustrated in cross section.
Figure 4:
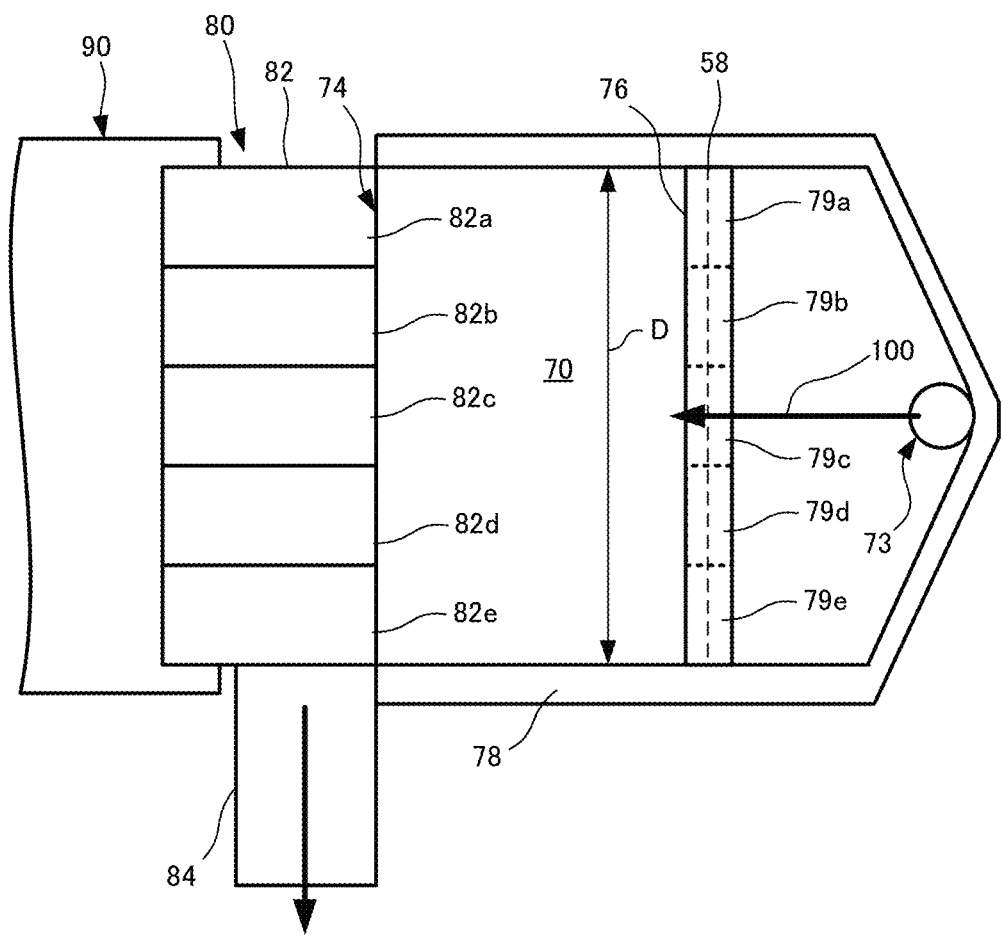
FIG. 4 is a plan view of a flow passage and the removal section.

The first image pickup section 50, the second image pickup section 60, and the removal section 80 are described with reference to FIG. 1 to FIG. 4. FIG. 2 is a side view of the first image pickup section 50, the second image pickup section 60, and the removal section 80, which are partially illustrated in cross section. FIG. 3 is a side view of the first image pickup section 50, the second image pickup section 60, and the removal section 80, which are partially illustrated in cross section, and FIG. 4 is a plan view of the flow passage 70 and the removal section 80.

As illustrated in FIG. 2 and FIG. 3, the fish roe paste production apparatus 10 includes the first image pickup section 50 arranged above the flow passage 70 and the second image pickup section 60 arranged below the flow passage 70. At least two image pickup sections (the first image pickup section 50 and the second image pickup section 60) are provided at positions at which at least two areas to be imaged (a first area 56 to be imaged and a second area 58 to be imaged) described later can be imaged, and perform image pickup processing. The two image pickup sections (the first image pickup section 50 and the second image pickup section 60) are configured to pick up an image of the fish roe paste passing by the areas to be imaged (the first area 56 to be imaged and the second area 58 to be imaged). The first image pickup section 50 includes a first irradiation part 52 and a first sensor 54, and the second image pickup section 60 includes a second irradiation part 62 and a second sensor 64.

The first irradiation part 52 and the second irradiation part 62 are configured to irradiate the fish roe paste with visible light or an ultraviolet ray. The reason for this is to excite the foreign substances through irradiation of visible light or an ultraviolet ray, to thereby discriminate the fish roe and the foreign substances. The wavelength for excitation varies depending on the target foreign substances, and *anisakis* is excited to fluoresce by visible light having a wavelength of from 380 nm to 450 nm and an ultraviolet ray having a wavelength of from 315 nm to 380 nm. The foreign substances are identified based on an image, and hence an ultraviolet ray (which is more likely to cause the foreign substances to strongly fluoresce) is more preferred. The first irradiation part 52 is arranged above the flow passage 70, and is configured to emit predetermined light at a predetermined angle, for example, 45 degrees with respect to a first inspection window 75. The second irradiation part 62 is arranged below the flow passage 70, and is configured to emit predetermined light at a predetermined angle, for example, 45 degrees with respect to a second inspection window 76.

As the first sensor 54 and the second sensor 64, a sensor capable of imaging *anisakis* in the fish roe paste, for example, a line sensor camera or an area sensor camera can be used. The fish roe paste is conveyed at a high speed in a state of being thinly spread, and hence it is preferred to use the line sensor camera because of the high processing ability.

As the line sensor camera, a line sensor camera having CCD elements arrayed in a row can be adopted. The first sensor 54 and the second sensor 64 can image the flow passage 70 across an entire width D thereof. The reason for this is to prevent omission of inspection. The first sensor 54 is configured to image the foreign substances having fluoresced by irradiation from the first irradiation part 52 when the foreign substances pass by the first area 56 to be imaged. The second sensor 64 is configured to image the foreign substances having fluoresced by irradiation from the second irradiation part 62 when the foreign substances pass by the second area 58 to be imaged. The first sensor 54 and the second sensor 64 image the foreign substances by a diffuse reflection method, which involves letting out light reflected regularly from the foreign substances among the light from the first irradiation part 52 and the second irradiation part 62, and receiving light which is uniform as a whole. The reason for this is to detect the foreign substances based on the difference in diffuse reflection between the foreign substances and the fish roe surface.

4. Flow Passage

As illustrated in FIG. 1 to FIG. 4, the flow passage 70 is an area for conveying the fish roe paste. A flow passage forming section 72 is configured to form the flow passage 70 for conveying the fish roe paste in a state of being thinly spread. The flow passage 70 is formed between a first opening 73 of the flow passage forming section 72 and a second opening 74 of the flow passage forming section 72. The first opening 73 is connected to one end of the second pipeline 36, and the second opening 74 is opened on the removal section 80 side. The fish roe paste is conveyed in the conveyance direction 100 from the first opening 73 to the second opening 74. The flow passage 70 in the first area 56 to be imaged and the second area 58 to be imaged has a height H illustrated in FIG. 2 and has the width D illustrated in FIG. 4. The flow passage 70 is spread in a thin film shape with the width D from the first opening 73, and hence the height H is smaller than the width D.

The first area 56 to be imaged and the second area 58 to be imaged are formed in an upper surface 72*a* and a lower surface 72*b* of the flow passage forming section 72, respectively, and are each made of a material that transmits predetermined visible light or a predetermined ultraviolet ray. The first area 56 to be imaged and the second area 58 to be imaged are formed across the width D of the flow passage 70. In the invention, the two areas to be imaged are formed. However, the invention is not limited thereto, and three or more areas to be imaged may be formed. The flow passage forming section 72 includes the first inspection window 75 in the upper surface 72*a* and the second inspection window 76 in the lower surface 72*b*. The reason for this is to set at least parts of the first inspection window 75 and the second inspection window 76 to be the first area 56 to be imaged and the second area 58 to be imaged, which are imaged by the first image pickup section 50 and the second image pickup section 60, respectively. The first inspection window 75 and the second inspection window 76 are formed across the width D of the flow passage 70. As described later, line sensors are adopted in the first area 56 to be imaged and the second area 58 to be imaged in this embodiment. Therefore, the first area 56 to be imaged and the second area 58 to be imaged have a linear shape as in the second area 58 to be imaged represented by the broken line in FIG. 4.

The first area 56 to be imaged and the second area 58 to be imaged are arranged with the flow passage 70 interposed therebetween. The reason for this is to reliably image the foreign substances passing through different sides of the flow passage. In a manual operation through visual inspection as in the related art, determination is made merely by watching the fish roe paste from above, and hence, it is difficult to find the foreign substances that are not observed because the foreign substances are present below the fish roe. However, through inspection of the foreign substances from above and below the flow passage 70, the foreign substances can be more reliably found. The first area 56 to be imaged and the second area 58 to be imaged are arranged so as to be opposed to each other. The first area 56 to be imaged and the second area 58 to be imaged may be arranged so as to be opposed to each other at the same position in the conveyance direction 100, or may be arranged so as to be opposed to each other at different positions displaced forward and backward in the conveyance direction 100. When the flow passage forming section 72 is arranged so as to be thinly spread on a horizontal plane as illustrated in FIG. 2 and FIG. 3, it is only required that the first area 56 to be imaged and the second area 58 to be imaged be positioned in the upper surface 72a and the lower surface 72b of the flow passage forming section 72, respectively. The reason for this is that both the foreign substances passing by the upper surface 72a side and the foreign substances passing by the lower surface 72b side can be imaged. In particular, linear foreign substances such as *anisakis* are longer than the fish roe, and hence there is a high possibility that at least a part of the foreign substances appears in at least one of the first area 56 to be imaged or the second area 58 to be imaged.

It is preferred that the first area 56 to be imaged and the second area 58 to be imaged be arranged adjacently to each other at close positions in the conveyance direction 100. The reason for this is to prevent omission of imaging of the foreign substances when the fish roe paste is flowing upward and downward. Further, it is preferred that the first inspection window 75 and the second inspection window 76 be arranged at different positions displaced forward and backward in the conveyance direction 100, and a surface of the flow passage forming section 72 on the lower surface 72b side and a surface of the flow passage forming section 72 on the upper surface 72a side, which reflect light having passed through the first inspection window 75 and the second inspection window 76, be made of a metal plate having metallic luster. Air bubbles in the fish roe paste passing through the flow passage 70 are reflected from the metal plate to have high brightness (halation), and portions having high brightness can be identified as the air bubbles by image processing, to thereby prevent the portions having high brightness from being recognized as the foreign substances. The surface of the flow passage forming section 72 on the lower surface 72b side and The surface of the flow passage forming section 72 on the upper surface 72a side may be made of a material that transmits light, for example, an acrylic plate instead of the metal plate. In this case, it is only required that light pass through the portions of the air bubbles, and the portions having low brightness (black color) be identified as the air bubbles in the image processing.

The first inspection window 75 and the second inspection window 76 are each made of a material that transmits light emitted from the first irradiation part 52 and the second irradiation part 62 and transmits fluorescence from the excited foreign substances. Glass or an acrylic resin can be adopted in the first inspection window 75 and the second inspection window 76. The flow passage forming section 72 is made of metal, and hence the first inspection window 75 and the second inspection window 76, which transmit predetermined light, are formed. However, as long as the entire flow passage forming section 72 is made of a material that transmits predetermined light, it is not required to form the "windows". Thus, the case in which the entire flow passage forming section 72 is made of a material that transmits predetermined light encompasses the case of setting areas in which the foreign substances are imaged by the first image pickup section 50 and the second image pickup section 60 to be the virtual "windows" as the first inspection window 75 and the second inspection window 76.

The flow passage forming section 72 includes a bottom member 78 and a lid member 77. The bottom member 78 has a groove forming the width of the flow passage 70, and the lid member 77 is configured to close an upper portion of the groove of the bottom member 78. In FIG. 4, the lid member 77 is not shown so that a change in the width D of the flow passage 70 can be understood. The flow passage 70 has the width D immediately before the first inspection window 75 and the second inspection window 76 from the first opening 73 and has the same width D up to the second opening 74. The reason for this is to cause the fish roe paste having passed by the first inspection window 75 and the second inspection window 76 to reach the removal section 80 without changing the position in a width direction of the flow passage 70.

The flow passage forming section 72 can adjust the height H of the flow passage 70 in the first area 56 to be imaged and the second area 58 to be imaged. As a method of adjusting the height H, there are given, for example, a method involving inserting a spacer between the lid member 77 and the bottom member 78 and a method involving replacing a plurality of bottom members 78 having different groove depths. The height H can be adjusted within a range of from 1.4 mm to 15 mm in accordance with the type of fish roe to be used in fish roe paste targeted for inspection. The reason for this is to improve the inspection efficiency and the reliability of finding of the foreign substances because the egg diameter (diameter of an egg) of fish roe varies depending on the type of the fish roe. When the height of the flow passage 70 is less than 1.4 mm, it is difficult to cause even relatively small fish roe (for example, pollock roe) that is used as edible fish roe to smoothly pass through the flow passage 70. When the height of the flow passage 7 is set to 1.4 mm or more, the flow rate of the fish roe paste in the flow passage 70 is increased to a practical range, thereby improving the inspection efficiency. Further, the flow passage 70 having a height of 15 mm or less is adaptable to even relatively large fish roe (for example, salmon roe) that is used as edible fish roe. Specifically, even when large salmon roe is used, the flow rate of the fish roe paste can be increased to a practical range, and the foreign substances can be prevented from being hidden behind salmon roe and pass by the first area 56 to be imaged and the second area 58 to be imaged, with the result that the reliability of detection of the foreign substances is improved.

As illustrated in FIG. 2 and FIG. 3, the height H may be set to be uniform in the entire region of the flow passage 70 in the conveyance direction 100. Further, the height H of the flow passage 70 in the first area 56 to be imaged and the second area 58 to be imaged may be adjusted by replacing the members forming the first inspection window 75 and the second inspection window 76 with respect to the flow passage forming section 72. This is because the replacement operation becomes easy in such a configuration.

The height H of the flow passage 70 in the first area 56 to be imaged and the second area 58 to be imaged can be adjusted to be more than a maximum diameter of the fish egg in the fish roe paste targeted for inspection and less than twice a minimum diameter of the fish egg in the fish roe paste targeted for inspection. When the height H is more than the maximum diameter of the fish egg, the fish roe paste can be conveyed in the flow passage 70. When the height H is less than twice the minimum diameter of the fish egg, the foreign substances can be more reliably imaged from the first area 56 to be imaged or the second area 58 to be imaged. Specifically, when the height is less than that of two fish eggs, the foreign substances are prevented from being sandwiched by the fish eggs from above and below to be hidden, and the foreign substances pass by any one of the first area 56 to be imaged and the second area 58 to be imaged, with the result that the foreign substances can be imaged. When the height H is set to be less than twice the minimum diameter of the fish egg, the probability of overlooking the foreign substances can be minimized.

The egg diameter of the fish roe used as edible fish roe is substantially as follows. Thus, specifically, in the case of salmon roe, it is preferred that the height H be adjusted to be from about 9 mm to about 15 mm, and in the case of other fish roe having an egg diameter of 2 mm or less, the height is adjusted to be preferably from 1 mm to 5 mm, more preferably from 1.4 mm to 3 mm. When there is a large variation in size of fish roe, the fish roe is classified based on the size, and then subjected to the method of the invention, thereby being capable of efficiently removing the foreign substances.

TABLE 1

| Type of fish | Fish roe | Egg diameter |
| --- | --- | --- |
| Salmon | Sujiko, Salmon roe | 7 mm to 8 mm |
| Alaska pollock | Pollock roe | 1.2 mm to 1.4 mm |
| Flying fish | Flying fish roe | 1.5 mm to 2 mm |
| Pacific cod | Pacific cod roe | 1 mm |
| Capelin | Capelin roe | 1.5 mm |

5. Inspection Section

The inspection section 40 is configured to perform inspection processing. As illustrated in FIG. 1 to FIG. 4, the inspection section 40 is configured to determine the presence or absence of the foreign substances that fluoresce by visible light or an ultraviolet ray based on the image picked up by the first sensor 54 of the first image pickup section 50 and the second sensor 64 of the second image pickup section 60. As compared to the manual operation through visual inspection by an operator as in the related art, the presence or absence of the foreign substances can be more reliably and efficiently determined.

The image processing part 42, the determination part 44, and the signal output part 48 of the inspection section 40 each include a CPU configured to execute a command of a control program for implementing each function, a ROM configured to store the control program, a RAM on which the control program is to be loaded, a storage device, for example, a memory configured to store the control program and various data. The display part 46 is configured to display the image, which is picked up by the first sensor 54 and the second sensor 64 or generated in the image processing part 42.

The image processing part 42 is configured to subject the image picked up by the first sensor 54 of the first image pickup section 50 and the second sensor 64 of the second image pickup section 60 to appropriate image processing to generate the inspection image. The inspection image is an image of the fish roe paste flowing through the flow passage 70 in the first area 56 to be imaged and the second area 58 to be imaged formed in the first inspection window 75 and the second inspection window 76. As the image processing, for example, grayscale conversion based on a grayscale value histogram and a tone curve, gamma conversion, conversion based on an S-shaped tone curve, grayscale conversion such as grayscale inversion or binarization processing, linear filter processing, smoothing filter processing, median filter processing, spatial filter processing such as edge enhancement or sharpening, and the like can be appropriately adopted in accordance with the shape and characteristics of the foreign substances. The image processing part 42 can use, as the inspection image, a grayscale image expressed in many gradations in accordance with the contrast of each image, a monochrome (black and white) binarized image obtained by binarization processing, or the like. The foreign substances that have fluoresced by the light from the first irradiation part 52 and the second irradiation part 62 become light in the inspection image, and the portion of the fish roe becomes dark in the inspection image.

The inspection section 40 is configured to determine the presence or absence of, in particular, the foreign substances having a linear shape. As the foreign substances, there can be given a parasite mixed in the fish roe, for example, *anisakis*. It has been known that *anisakis* fluoresces by a predetermined ultraviolet ray. The foreign substances such as *anisakis* may pass through the holes of the strainer 32 of the pretreatment section 30, and hence, it is desired that the foreign substances be detected in the inspection section 40.

The determination part 44 is configured to determine the presence or absence of the foreign substances in the inspection image generated in the image processing part 42. As a determination method, for example, a method involving defining a pixel with luminance having a predetermined threshold value or more in the inspection image as a detection subject and determining the presence or absence of the foreign substances based on the continuous area of the detection subject, a method of determining the presence or absence of the foreign substances based on the continuous length of the detection subject, a method of determining the presence or absence of the foreign substances based on matching between the detection subject and a pattern prepared in advance, or the like may be appropriately adopted in accordance with the shape and characteristics of the foreign substances. The inspection image determined to contain the foreign substances is displayed on the display part 46. Further, when it is determined in the determination part 44 that there are the foreign substances, the signal output part 48 outputs the defective product signal to the removal section 80.

In the inspection processing, for example, one or more areas to be inspected are set in a direction orthogonal to the conveyance direction 100 of the fish roe paste in the flow passage 70, and the presence or absence of the foreign substances is determined in each of the areas to be inspected. More specifically, as illustrated in FIG. 4, the determination part 44 virtually sets a first area 79a to be inspected to a fifth area 79e to be inspected in the inspection image as the plurality of areas to be inspected in the direction orthogonal to the conveyance direction 100 of the fish roe paste in the flow passage 70. In FIG. 4, the first area 79a to be inspected to the fifth area 79e to be inspected are illustrated virtually by the broken lines on the second inspection window 76. Then, the determination part 44 determines the presence or absence of the foreign substances in each of the first area 79a to be inspected to the fifth area 79e to be inspected in the detection image. In this case, the first area 79a to be inspected to the fifth area 79*e* to be inspected, which are obtained by equally dividing the inspection image into five portions in the direction of the width D, are set. However, when the width D of the flow passage 70 is small, one area to be inspected may be set, or two or more areas to be inspected may be set in accordance with the configuration of the removal section 80. Through reduction in size of each of the areas to be inspected, a loss of the fish roe paste to be removed can be reduced, which is removed by operating a first lift plate 82*a* to a fifth lift plate 82*e* corresponding to the first area 79*a* to be inspected to the fifth area 79*e* to be inspected in the removal section 80 positioned on a downstream side of the conveyance direction 100.

6. Removal Section

As illustrated in FIG. 1 to FIG. 4, the removal section 80 is provided on the downstream side of the conveyance direction 100 in the flow passage forming section 72, and is configured to perform removal processing. The removal section 80 is provided adjacently to the second opening 74. The removal section 80 includes lift plates 82, a discharge passage 84, and the removal section control unit 86.

The removal section 80 is configured to remove a portion determined to contain the foreign substances in the inspection section 40 from the fish roe paste. Thus, when the foreign substances are reliably imaged by the first image pickup section 50 and the second image pickup section 60, and the presence or absence of the foreign substances are efficiently determined in the inspection section 40, the foreign substances can be reliably and efficiently removed in the removal section 80.

The lift plates 82 include the first lift plate 82*a* to the fifth lift plate 82*e*. The first lift plate 82*a* to the fifth lift plate 82*e* are provided so as to correspond to the first area 79*a* to be inspected to the fifth area 79*e* to be inspected. Specifically, a portion of the fish roe paste imaged in the first area 79*a* to be inspected is conveyed along the conveyance direction 100 and reach the first lift plate 82*a*. Similarly, the second area 79*b* to be inspected to the fifth area 79*e* to be inspected also correspond to the second lift plate 82*b* to the fifth lift plate 82*e*.

The first lift plate 82*a* to the fifth lift plate 82*e* are each lifted on the second opening 74 side in response to the command from the removal section control unit 86 as illustrated in FIG. 2 and FIG. 3.

The removal section 80 is configured to remove the fish roe paste in the area to be inspected, which has been determined to contain the foreign substances in the determination part 44, among the first area 79*a* to be inspected to the fifth area 79*e* to be inspected. For example, when the determination part 44 determines that the first area 79*a* to be inspected contains the foreign substances, the signal output part 48 outputs the defective product signal to the removal section control unit 86. The removal section control unit 86 lifts the first lift plate 82*a* on the second opening 74 side and maintains a state illustrated in FIG. 3 for a predetermined time period. The predetermined time period corresponds to at least a time period from a time before the foreign substances reach the first lift plate 82*a* to a time at which the foreign substances fall to the discharge passage 84. The predetermined time period can be determined based on the speed at which the fish roe paste is conveyed.

The fish roe paste in the portion determined to contain the foreign substances falls to the discharge passage 84 positioned below the first lift plate 82*a*. The fish foe paste having fallen to the discharge passage 84 is discarded. Further, the fish roe paste that has not been determined to contain the foreign substances slides on the second lift plate 82*b* to the fifth lift plate 82*e* and falls to the product extracting section 90. When the redetermined time period elapses, the first lift plate 82*a* is lowered to return to a state of FIG. 2, and the fish roe paste slides on the first lift plate 82*a* to the fifth lift plate 82*e* to be collected to the product extracting section 90.

The flow passage 70 is set so as to be spread on the horizontal plane, and hence the fish roe paste having passed by the first area 56 to be imaged and the second area 58 to be imaged is conveyed to the lift plates 82 while hardly moving in the direction orthogonal to the conveyance direction 100. The first lift plate 82*a* to the fifth lift plate 82*e* are arranged with the same widths as those of the first area 79*a* to be inspected to the fifth area 79*e* to be inspected, respectively. Therefore, for example, the foreign substances having passed through the first area 79*a* to be inspected are conveyed to the first lift plate 82*a*. When the flow passage 70 is set so as to be spread on a plane other than the horizontal plane, plates extending from the first area 79*a* to be inspected to the fifth area 79*e* to be inspected to the first lift plate 82*a* to the fifth lift plate 82*e* along the conveyance direction 100 of the flow passage 70 may be provided so that the foreign substances do not move in the direction orthogonal to the conveyance direction 100.

Further, when it has been determined that there are the foreign substances in a region in which the two areas to be inspected are adjacent to each other, for example, a region between the first area 79*a* to be inspected and the second area 79*b* to be inspected, it is only required that the first lift plate 82*a* and the second lit plate 82*b* be lifted. The reason for this is to reliably remove the foreign substances.

When the lift plates 82 includes the plurality of lift plates including the first lift plate 82*a* to the fifth lift plate 82*e*, only a small amount of fish roe paste containing the foreign substances can be removed without overly discarding the fish roe paste to be a product.

One lift plate 82 may be provided in place of the first lift plate 82*a* to the fifth lift plate 82*e*. In this case, the processing in the determination part 44 may not be performed by dividing the inspection image into the first area 79*a* to be inspected to the fifth area 79*e* to be inspected, and hence the processing burden in the determination part 44 can be reduced.

The removal section 80 in the invention may adopt any method as long as the method enables the fish roe containing the foreign substances to be extracted to the outside of the system. The fish roe in a region in which the foreign substances are mixed may be removed by causing the fish roe to fall as described above or may be removed by a method involving sucking a portion corresponding to the foreign substances.

Figure 5:
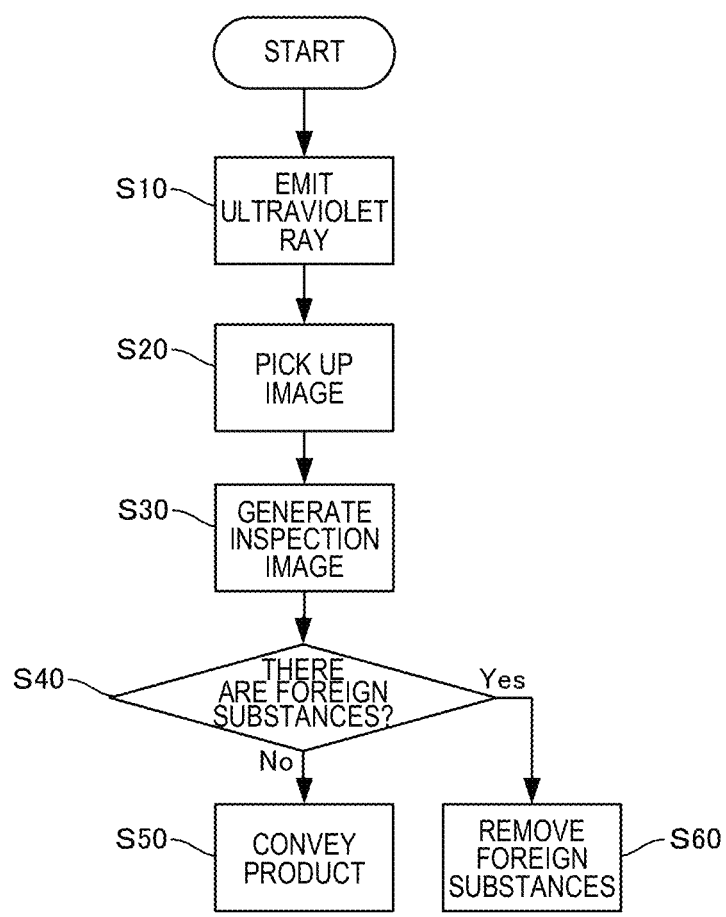
FIG. 5 is a flowchart for illustrating a method of producing fish roe paste having foreign substances removed therefrom.

7. Method of Producing Fish Roe Paste Having Foreign Substances Removed Therefrom A method of producing fish roe paste having foreign substances removed therefrom is described in detail with reference to FIG. 1 to FIG. 5. FIG. 5 is a flowchart for illustrating a method of producing fish roe paste having foreign substances removed therefrom (hereinafter referred to as "fish roe paste production method").

The fish roe paste production method includes: image pickup processing of irradiating fish roe paste with visible light or an ultraviolet ray through the first area 56 to be imaged and the second area 58 to be imaged, which are formed across a full width of the flow passage 70 for conveying the fish roe paste, and picking up an image of the fish roe paste passing by the first area 56 to be imaged and the second area 58 to be imaged; inspection processing of determining the presence or absence of the foreign substances that fluoresce by the visible light or the ultraviolet ray based on the image picked up in the image pickup processing; and removal processing of removing a portion determined to contain the foreign substances in the inspection processing from the fish roe paste. Further, the fish roe paste that has not been determined to contain the foreign substances is subjected to product conveyance processing of conveying the fish roe paste to the product extracting section 90 as a product. The first area 56 to be imaged and the second area 58 to be imaged are arranged so as to sandwich the flow passage 70 therebetween.

As illustrated in FIG. 5, processing of Step S10 to Step S30 is performed in the image pickup processing, processing of Step S40 is performed in the inspection processing, processing of Step S50 is performed in the product conveyance processing, and processing of Step S60 is performed in the removal processing.

In Step S10, for example, an ultraviolet ray is emitted from the first irradiation part 52 and the second irradiation part 62. The reason for this is to excite the foreign substances in the fish roe paste to cause the foreign substances to fluoresce. The first irradiation part 52 and the second irradiation part 62 are described in the above-mentioned Section 3, and hence the detailed description thereof is omitted.

In Step S20, in the first image pickup section 50 and the second image pickup section 60, the first sensor 54 and the second sensor 64 pick up an image of the fish roe paste in the first area 56 to be imaged and the second area 58 to be imaged. The first sensor 54 and the second sensor 64 are described in the above-mentioned Section 3, and hence the detailed description thereof is omitted.

In Step S30, the image processing part 42 subjects the image thus picked up to predetermined processing to generate an inspection image. The reason for this is to reliably determine the presence or absence of the foreign substances in the determination part 44.

In Step S40, the determination part 44 starts inspection processing and determines the presence or absence of the foreign substances in the inspection image. The inspection processing is performed by detecting the foreign substances having a predetermined shape, which have fluoresced by the ultraviolet ray in the inspection image. For example, the inspection processing can determine the presence or absence of the foreign substances (for example, *anisakis*) having a linear shape. This is because, when the foreign substances have a linear shape as in *anisakis*, there is a risk in that the foreign substances may pass through the strainer 32 and cannot be easily removed. When it has been determined in the inspection processing that there are the foreign substances, the signal output part 48 outputs the defective product signal to the removal section control unit 86. The reason for this is to remove a portion determined to contain the foreign substances from a product in the removal section 80.

In Step S50, the fish roe paste that has not been determined to contain the foreign substances in the inspection processing is conveyed as a product. The fish roe paste as the product is extruded from the second opening 74 of the flow passage forming section 72 and flows on an upper surface of the lift plate 82 to be collected to the product extracting section 90 (FIG. 2).

In Step S60, the portion determined to contain the foreign substances in the inspection processing is removed from the fish roe paste as the product. Specifically, in the removal section 80, the lift plate 82 is lifted in response to the command from the removal section control unit 86, and the portion containing the foreign substances is caused to fall to the discharge passage 84 to prevent mixing of the portion containing the foreign substances in the product extracting section 90. In order to reduce waste by reducing the fish roe paste containing the foreign substances, which is to be removed, the inspection processing may include setting a plurality of areas to be inspected (the first area 79*a* to be inspected to the fifth area 79*e* to be inspected) in the direction orthogonal to the conveyance direction 100 of the fish roe paste in the flow passage 70 and determining the presence or absence of the foreign substances in each of the first area 79*a* to be inspected to the fifth area 79*e* to be inspected. In this case, in the removal processing, the fish roe paste in the area to be inspected that has been determined to contain the foreign substances is removed. The removal section 80 is described in the above-mentioned Section 6, and hence the detailed description thereof is omitted.

Example 1

An experiment of removing *anisakis* from fish roe paste of pollock roe (egg diameter: about 1 mm) was performed through use of the fish roe paste production apparatus 10 and the fish roe paste production method described with reference to FIG. 1 to FIG. 5.

The first irradiation part 52 and the second irradiation part 62 emitted an ultraviolet ray having a wavelength of 365 nm at an angle of 45 degrees with respect to the first inspection window 75 and the second inspection window 76. The width D of the flow passage 70 was 160 mm. The first sensor 54 and the second sensor 64 were line sensor cameras, and imaged the fish roe paste from a direction vertical to the first inspection window 75 and the second inspection window 76. The flow rate of the fish roe paste in the flow passage 70 was from 60 m/min to 70 m/min.

Figure 6:
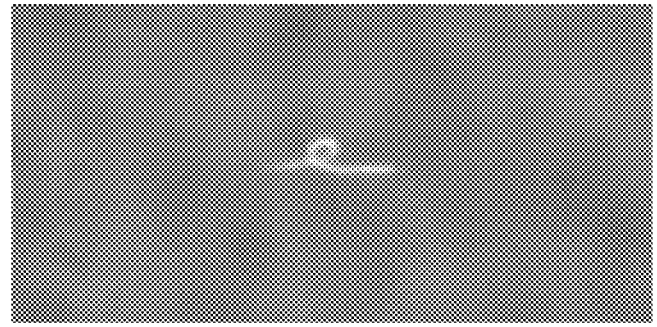
FIG. 6 illustrates *anisakis* in imaged fish roe paste.
Figure 6:
Figure 6:
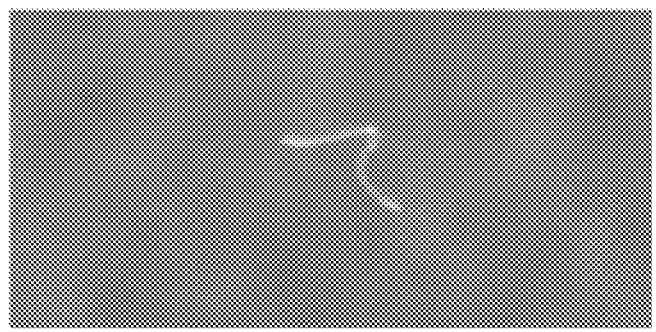

In images generated in the image processing part 42, portions determined to contain foreign substances were enlarged and illustrated in FIG. 6. In the images, *anisakis* was able to be identified in the fish roe paste. In *anisakis* identified as the foreign substances in the determination part 44, the smallest in diameter was 0.2 mm (length: about 5 mm). A linear white portion in each of the images in FIG. 6 corresponds to *anisakis*. In general, *anisakis* has a spiral shape, and it is considered that *anisakis* was spread in the conveyance direction 100 while moving in the flow passage 70 to have a state illustrated in FIG. 6.

When the fish roe paste in the product extracting section 90 was visually inspected, *anisakis* was not able to be found.

The invention is not limited to the above-described embodiments, and various modifications can be made. For example, the invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

The invention claimed is:

1. A method of producing fish roe paste from which foreign substances are removed, the method comprising:
    image pickup processing of irradiating fish roe paste with visible light or an ultraviolet ray through at least two areas to be imaged that are formed across a full width of a flow passage for conveying the fish roe paste, and picking up an image of the fish roe paste passing by each of the at least two areas to be imaged;

inspection processing of determining presence or absence of foreign substances that fluoresce by the visible light or the ultraviolet ray based on the image picked up in the image pickup processing; and removal processing of removing from the fish roe paste a portion determined to contain the foreign substances in the inspection processing, wherein the at least two areas to be imaged are arranged so as to sandwich the flow passage therebetween.

2. The method of producing fish roe paste from which foreign substances are removed according to claim 1, wherein a height of the flow passage in the at least two areas to be imaged is adjusted to be within a range of from 1.4 mm to 15 mm in accordance with a type of fish roe to be used in the fish roe paste.

3. The method of producing fish roe paste from which foreign substances are removed according to claim 1, wherein a height of the flow passage in the at least two areas to be imaged is adjusted to be more than a maximum diameter of a fish egg in the fish roe paste and less than twice a minimum diameter of the fish egg in the fish roe paste.

4. The method of producing fish roe paste from which foreign substances are removed according to claim 1, wherein the inspection processing includes determining presence or absence of the foreign substances having a linear shape.

5. The method of producing fish roe paste from which foreign substances are removed according to claim 1,
wherein the inspection processing includes setting one or more areas to be inspected in a direction orthogonal to a conveyance direction of the fish roe paste in the flow passage, and determining presence or absence of the foreign substances in each of the one or more areas to be inspected, and
wherein the removal processing includes removing the fish roe paste in one of the one or more areas to be inspected that has been determined to contain the foreign substances.

6. An apparatus for producing fish roe paste from which foreign substances are removed, the apparatus being used in the method of producing fish roe paste from which foreign substances are removed according to claim 1, the apparatus comprising:
a flow passage forming section configured to form the flow passage having a width D for conveying a layer of the fish roe paste in a state of being thinly spread, the flow passage having a height H smaller than the width D;
the at least two areas to be imaged being at least two linear areas that are formed in an upper surface and a lower surface of the flow passage forming section, and are each made of a material that transmits predetermined visible light or a predetermined ultraviolet ray and are formed across an entirety of the width D;
at least two image pickup sections that are provided at positions at which the at least two linear areas to be imaged are able to be imaged, and are configured to perform the image pickup processing by picking up an image of the fist roe paste passing by each of the at least two linear areas to be imaged, each of the at least two image pickup sections including a line sensor camera having CCD elements arrayed in a row and configured to image the flow passage across an entirety of the width D;
an inspection section configured to perform the inspection processing; and
a removal section that is provided on a downstream side of a conveyance direction in the flow passage forming section, and is configured to perform the removal processing from the layer of the fish roe paste.

7. An apparatus for producing fish roe paste from which foreign substances are removed, the apparatus comprising:
a flow passage forming section configured to form a flow passage having a width D for conveying a layer of fish roe paste in a state of being thinly spread, the flow passage having a height H smaller than the width D;
at least two linear areas to be imaged that are formed in an upper surface and a lower surface of the flow passage forming section, and are each made of a material that transmits predetermined visible light or a predetermined ultraviolet ray and are formed across an entirety of the width D;
at least two image pickup sections that are provided at positions at which the at least two linear areas to be imaged are able to be imaged, and are configured to pick up an image of the fish roe paste passing by each of the at least two linear areas to be imaged, each of the at least two image pickup sections including a line sensor camera having CCD elements arrayed in a row and configured to image the flow passage across an entirety of the width D;
an inspection section configured to determine presence or absence of foreign substances that fluoresce by the predetermined visible light or the predetermined ultraviolet ray based on the image picked up by the at least two image pickup sections; and
a removal section that is provided on a downstream side of a conveyance direction in the flow passage forming section, and is configured to remove from the layer of fish roe paste a portion determined to contain the foreign substances in the inspection section.

8. The method of producing fish roe paste from which foreign substances are removed according to claim 2, wherein the inspection processing includes determining presence or absence of the foreign substances having a linear shape.

9. The method of producing fish roe paste from which foreign substances are removed according to claim 3, wherein the inspection processing includes determining presence or absence of the foreign substances having a linear shape.

10. The method of producing fish roe paste from which foreign substances are removed according to claim 2,
wherein the inspection processing includes setting one or more areas to be inspected in a direction orthogonal to a conveyance direction of the fish roe paste in the flow passage, and determining presence or absence of the foreign substances in each of the one or more areas to be inspected, and
wherein the removal processing includes removing the fish roe paste in one of the one or more areas to be inspected that has been determined to contain the foreign substances.

11. The method of producing fish roe paste from which foreign substances are removed according to claim 3,
wherein the inspection processing includes setting one or more areas to be inspected in a direction orthogonal to a conveyance direction of the fish roe paste in the flow passage, and determining presence or absence of the foreign substances in each of the one or more areas to be inspected, and wherein the removal processing includes removing the fish roe paste in one of the one or more areas to be inspected that has been determined to contain the foreign substances.

12. An apparatus for producing fish roe paste from which foreign substances are removed, the apparatus being used in the method of producing fish roe paste from which foreign substances are removed according to claim 2, the apparatus comprising:

a flow passage forming section configured to form the flow passage having a width D for conveying a layer of the fish roe paste in a state of being thinly spread, the flow passage having a height H smaller than the width D;

the at least two areas to be imaged being at least two linear areas that are formed in an upper surface and a lower surface of the flow passage forming section, and are each made of a material that transmits predetermined visible light or a predetermined ultraviolet ray and are formed across an entirety of the width D;

at least two image pickup sections that are provided at positions at which the at least two linear areas to be imaged are able to be imaged, and are configured to perform the image pickup processing by picking up an image of the fish roe paste passing by each of the at least two linear areas to be imaged, each of the at least two image pickup sections including a line sensor camera having CCD elements arrayed in a row and configured to image the flow passage across an entirety of the width D;

an inspection section configured to perform the inspection processing; and a removal section that is provided on a downstream side of a conveyance direction in the flow passage forming section, and is configured to perform the removal processing from the layer of the fish roe paste.

13. An apparatus for producing fish roe paste from which foreign substances are removed, the apparatus being used in the method of producing fish roe paste from which foreign substances are removed according to claim 3, the apparatus comprising:

a flow passage forming section configured to form the flow passage having a width D for conveying a layer of the fish roe paste in a state of being thinly spread, the flow passage having a height H smaller than the width D;

the at least two areas to be imaged being at least two linear areas that are formed in an upper surface and a lower surface of the flow passage forming section, and are each made of a material that transmits predetermined visible light or a predetermined ultraviolet ray and are formed across an entirety of the width D;

at least two image pickup sections that are provided at positions at which the at least two linear areas to be imaged are able to be imaged, and are configured to perform the image pickup processing by picking up an image of the fish roe paste passing by each of the at least two linear areas to be imaged, each of the at least two image pickup sections including a line sensor camera having CCD elements arrayed in a row and configured to image the flow passage across an entirety of the width D;

an inspection section configured to perform the inspection processing; and a removal section that is provided on a downstream side of a conveyance direction in the flow passage forming section, and is configured to perform the removal processing from the layer of the fish roe paste.

* * * * *

UNITED STATES PATENT AND TRADEMARK OFFICE
CERTIFICATE OF CORRECTION

PATENT NO. : 11,154,083 B2  
APPLICATION NO. : 16/333897  
DATED : October 26, 2021  
INVENTOR(S) : Tomonori Hashidate et al.

Page 1 of 1

It is certified that error appears in the above-identified patent and that said Letters Patent is hereby corrected as shown below:

In the Claims

<u>Column 17</u>
Line 65, "fist" should be --fish--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*